United States Patent Office 3,278,632
Patented Oct. 11, 1966

3,278,632
CATALYST AND POLYMERISATION PROCESS USING SAID CATALYST
James Keith Hambling and Alan Arthur Yeo, both of Sunbury-on-Thames, England, assignors to The British Petroleum Company Limited, London, England, a British joint-stock corporation
No Drawing. Filed Nov. 22, 1961, Ser. No. 154,320
Claims priority, application Great Britain, Dec. 1, 1960, 41,313/60
3 Claims. (Cl. 260—683.15)

This invention relates to an improved catalyst and to a polymerisation process using said catalyst.

According to one aspect of this invention there is provided a catalyst consisting of or containing an elemental alkali metal deposited on a lamellar complex, said complex consisting of or containing an alkali metal and carbon.

Preferably the complex consists of or contains potassium, rubidium or caesium, or two or all three of these metals. Preferably the elemental alkali metal deposited on the complex is sodium or lithium or both of these metals. Preferably the amount of elemental metal deposited is in the range 1–20% by weight based on the complex.

A particularly preferred catalyst consists of elemental sodium deposited on a complex of potassium and carbon. Preferred potassium complexes have the formulae $KC_8$, $KC_{16}$, $KC_{24}$, $KC_{36}$, $KC_{48}$ and $KC_{60}$ or mixtures thereof, but if desired homologous complexes of higher carbon to potassium ratio may be employed. The production of potassium complexes is described by W. Rudoff and E. Schulze in Zeitung Anorg. u. allgem. Chem. vol. 277 at page 156 et seq. (1954).

According to another aspect of this invention there is provided a process for the production of a catalyst which comprises depositing an elemental alkali metal on a lamellar complex consisting of or containing an alkali metal and carbon.

Suitably, the catalyst will be formed by pre-forming a lamellar complex by heating a mixture of alkali metal and carbon and thereafter heating the complex so formed with a different alkali metal.

According to another aspect of this invention there is provided a process for the production of a catalyst which comprises mixing together (a) an alkali metal selected from sodium and lithium, (b) an alkali metal selected from potassium, rubidium and caesium and (c) carbon in a form which is capable of forming a lamellar complex with an alkali metal, and maintaining the mixture under conditions such that lamellar complex formation takes place.

The carbon used in accordance with this invention will preferably be wholly or partly in the form of natural or synthetic graphite. However other forms of carbon may be employed providing that they are capable of reacting with an alkali metal to form a lamellar complex. Thus there may be employed forms of carbon which contain graphite in microcrystalline form together with carbon of a nature which does not form lamellar complexes with alkali metals. The carbon employed may contain trace impurities in the form of metal compounds. Metals derived from trace impurities, for example iron and aluminium, may form an association with these lamellar structures, and may exert a modifying effect upon the reactions according to this invention.

According to another aspect of this invention an unsaturated organic compound is polymerised in contact with a catalyst as hereinbefore described.

Usually a pre-formed catalyst will be brought into contact with the unsaturated organic compound; this is not essential if the polymerisation conditions are such that the catalyst will form in situ and in this case (a) a lamellar complex and an elemental alkali metal or (b) a mixture of alkali metals and carbon, may be brought into contact with the unsaturated organic compound.

The catalyst may consist wholly of an alkali metal deposited on a lamellar complex or may consist of or contain a mixture of this material with (a) alkali metal and/or (b) carbon and/or (c), a lamellar complex.

To obtain high yields of the polymer initially formed, that is, to avoid or reduce the extent of isomerization reactions, the temperature of reaction should be set at a low value within the range of operable temperatures; having set this temperature, the contact time employed should be maintained as short as is technically feasible.

Usually temperatures in the rangs $-10°$ C. to $400°$ C., for example $160°$ C., will be employed for effecting the polymerisation of open chain mono-olefinic compounds. Usually low temperatures will be employed for the polymerisation of dienes or styrene; thus temperatures of about $-10°$ C. or higher may be used. In general a temperature of about $20°$ C. will be satisfactory for the polymerisation of dienes or styrene.

The process may be employed for the production of dimers in major proportion from propylene, in which case the preferred reaction temperature will lie in the range $100°$ to $200°$. Above this temperature range, higher polymers are formed; for the production of propylene trimer and tetramer the preferred reaction temperature lies in the range, $200-300°$ C.

Usually the reaction pressure will be superatmospheric, preferably being in the range 50 to 4000 lbs./sq. in. gauge. The combination of polymerisation conditions employed will be selected according to the reactivity of the olefinic compound and the nature of the product required.

The process may be carried out either in the presence or absence of a solvent. Preferred solvent are hydrocarbons, for example normally liquid paraffins; normal heptane is a particularly suitable solvent.

The process may be employed for the polymerisation of olefinic or acetylenic compounds.

Preferred olefinic compounds for use in the process of this invention are olefinic hydrocarbons; if desired, however compounds containing one or more functional groups may be used.

Preferred olefinic hydrocarbons are mono-olefins; other hydrocarbons which may be employed are dienes or polyenes. Olefins having 3 or 4 carbon atoms per molecule are particularly preferred.

When using propylene, this hydrocarbon will preferably be employed free of water or having a water content not greater than 0.001% by wt.; in comparison with a process using propylene saturated with water the improvement in yield of propylene dimer, using suitable reaction conditions, is usually quite marked and in certain cases may be as much as 30% by wt.

Furthermore, when using propylene, this hydrocarbon will preferably be employed in the absence of allene and methacetylene or in the presence of only a low total percentage content of these materials based on feedstock. Preferably the total content of allene and methacetylene is less than 0.02% by weight of the propylene.

The preferred catalyst for effecting the dimerisation of propylene to 4-methyl pentene-1 is sodium deposited on a potassium/graphite complex.

According to a further aspect of this invention there is provided a process for the production of 4-methyl pentene-1 which comprises polymerising propylene in contact with a catalyst consisting of or comprising elemental sodium deposited on a complex of the formula $KC_x$ where $x$ is 8, 16, 24, 36, 48 or 60, or mixtures of these complexes, and recovering from the product a $C_6$ fraction consisting of or containing 4-methyl pentene-1.

In general, high yields of 4-methyl pentene-1 will be obtained when the value of $x$ is low. Variations in yield at a given value of $x$ are to be expected when using $KC_x$ compounds derived from different sources of carbon. In general $KC_x$ compounds derived from carbon of low ash content favour high yields of 4-methyl pentene-1. Preferably the ash content of carbon used for forming the $KC_x$ compound lies below 0.2% by weight. When using $KC_{24}$ it is particularly necessary to avoid $KC_{24}$ compounds of high impurity if 4-methyl pentene-1 is desired since in the presence of certain elements the reaction to 2-methyl pentene-2 will be favoured.

The invention is illustrated but not limited with reference to the following example.

To 33 grams of graphite, dried at 400° C. and 0.1 mm. and stirred under an atmosphere of pure dry nitrogen at 275° C., was added 4.3 grams of potassium metal. After the reaction was completed 4 grams of sodium metal was added and stirring continued until a fine dispersion was obtained.

This catalyst was charged to a one litre rocking autoclave and reacted with propylene at 140° C. and 1700 lbs./sq. in. gauge.

After twenty hours the product was obtained by distillation from the autoclave and separated from the excess propylene by evaporation. Yield of hexenes was 170 grams. Analysis of the hexene mixture showed the presence of the following isomers:

| | Percent |
|---|---|
| 4-methylpentene-1 | 29 |
| 4-methylpentene-2 | 60 |
| 2-methylpentene-1 | 2 |
| 2-methylpentene-2 | 5 |
| n-Hexene | 4 |

We claim:
1. A process for the production of a hexene fraction containing a substantial proportion of 4-methylpentene-1, comprising the steps of: contacting propylene at a temperature in the range of 100–200° C. with a catalyst composition comprising,
   (a) a lamellar complex catalyst selected from the group consisting of lamellar complex catalysts of potassium and graphite having the formula $KC_8$, $KC_{16}$, $KC_{24}$, $KC_{36}$, $KC_{48}$, and $KC_{60}$, and mixtures of the foregoing, and
   (b) elemental sodium deposited on said complex catalyst.

2. A process for the polymerisation of propylene comprising: contacting propylene at a temperature in the range 100°–200° C. with a catalyst composition comprising
   (a) a lamellar complex catalyst selected from the group consisting of lamellar complex catalysts of potassium and graphite having the formula $KC_8$, $KC_{16}$, $KC_{24}$, $KC_{36}$, $KC_{48}$, and $KC_{60}$, and mixtures of the foregoing, and
   (b) elemental sodium deposited on said complex catalyst in an amount from 1–20% by wt. based on said complex.

3. A catalyst composition comprising:
   (a) a lamellar complex catalyst selected from the group consisting of lamellar complex catalysts of potassium and graphite having the formula $KC_8$, $KC_{16}$, $KC_{24}$, $KC_{36}$, $KC_{48}$, and $KC_{60}$, and mixtures of the foregoing, and
   (b) elemental sodium deposited on said complex catalyst.

References Cited by the Examiner
UNITED STATES PATENTS

| | | | |
|---|---|---|---|
| 2,881,234 | 4/1959 | Esmay et al. | 260—683.15 |
| 2,965,624 | 12/1960 | Anderson | 260—94.2 |
| 2,986,588 | 5/1961 | Schramm | 260—683.15 |
| 3,006,976 | 10/1961 | Shaw et al. | 260—683.15 |
| 3,190,937 | 6/1965 | Yeo et al. | 260—683.15 |

FOREIGN PATENTS 825,902 12/1959 Great Britain.

PAUL M. COUGHLAN, JR., *Primary Examiner.*
ALPHONSO D. SULLIVAN, *Examiner.*